United States Patent [19]
Romero et al.

[11] Patent Number: 5,024,109
[45] Date of Patent: Jun. 18, 1991

[54] METHOD AND APPARATUS FOR PERFORMING HYDROSTATIC CORRECTION IN A PIPETTE

[75] Inventors: Hugo Romero, New Rochelle, N.Y.; Robert Anderson, Monroe, Conn.

[73] Assignee: Medical Laboratory Automation, Inc., Pleasantville, N.Y.

[21] Appl. No.: 477,314

[22] Filed: Feb. 8, 1990

[51] Int. Cl.$^5$ .............................................. G01N 1/14
[52] U.S. Cl. .................................................. 73/864.16
[58] Field of Search ........... 73/863.02, 864.13, 864.16, 73/864.17, 864.18; 422/100; 364/571.01; 436/179

[56] References Cited

U.S. PATENT DOCUMENTS

| | | | |
|---|---|---|---|
| 4,821,586 | 4/1989 | Scordato et al. | 73/864.18 |
| 4,896,270 | 1/1990 | Kalmakis et al. | 73/864.16 |
| 4,905,526 | 3/1990 | Magnussen, Jr. et al. | 173/864.18 |

Primary Examiner—Robert Raevis
Attorney, Agent, or Firm—Wolf, Greenfield & Sacks

[57] ABSTRACT

This invention provides a method and apparatus for correcting for the hydrostatic dead volume error which may occur in a pipette system and may also include method and apparatus for correcting for a lost fluid volume error. The technique involves determining the height of fluid in the tip for a desired fluid volume, determining the change in the dead volume resulting from having fluid of such height in the tip and determining the piston displacement required to achieve a volume equal to the sum of the desired volume and the determined change in dead volume, this determined displacement being the piston movement required to achieve the desired fluid volume. The height is determined from the volume multiplied by values which are constant for a given tip size and geometry. The change in dead volume varies as a function of the desired fluid height times a constant for a given fluid, pipette system and tip. Where a plurality of fluid samples are in the tip, and at least some of the samples are separated by a gas, the height, dead volume change and piston displacement determinations are made for each measured piston displacement to either intake or dispense. For multiple samples, height determinations for each sample are made utilizing only fluid heights. Where appropriate, a lost fluid volume correction value may also be added to the corrected volume utilized to perform piston displacement calculations.

20 Claims, 2 Drawing Sheets

METHOD AND APPARATUS FOR PERFORMING HYDROSTATIC CORRECTION IN A PIPETTE

FIELD OF THE INVENTION

This invention relates to pipettes, and more specifically to a method and apparatus for performing a correction for the volume change of the dead volume air trapped in a pipette when fluid is drawn in, which change results from changes in the pressure applied to the dead volume.

BACKGROUND OF THE INVENTION

When the tip of a piston operated pipette is placed in a fluid, prior to intake, a volume of air is trapped within the tip and the piston chamber. This volume of air is normally referred to a the "dead volume" (DV) and is generally a constant which is determined by the pipette tip and of air passages and chambers in the pipette nozzle. The DV may be much larger than the fluid volume being inputted and/or dispensed.

When fluid is drawn into the pipette tip, a fluid column of height h is created. The weight of this fluid column is supported by a pressure difference between the dead volume and atmospheric pressure. Since this pressure within the dead volume is less than atmospheric pressure, and since, in accordance with Boyle's Law, the product of pressure and volume is constant (i.e., $PV=K$), this reduction in pressure of the dead volume causes a small increase in the dead volume.

This change in volume is normally relatively small, and has heretofore generally been ignored when utilizing a pipette. However, since the DV is larger than the fluid volume, and in some systems much larger than the fluid volume, even a small percentage change in DV can cause appreciable errors in fluid volume. Therefore, in high precision applications, particularly applications for an electronic pipette such as that shown in U.S. Pat. No. 4,821,586 Apr. 18, 1989, entitled "Programmable Pipette", the error caused by changes in the dead volume results in unacceptable errors in the quantity of fluid or fluids drawn into or dispensed from the pipette. While in most applications, this error will be less than 2%, as will be discussed in greater detail later, the percentage of this error grows larger for small volumes, and may approach 7-10% for very small volumes. It is therefore desirable that this error be taken into account when performing high precision pipetting operations. This is true whether the pipette is being operated in normal mode where metering is done on intake, or in reverse mode where metering is done on dispense.

While the error resulting from changes in hydrostatic pressure on the dead volume may be a problem when a single fluid is being pipetted, it can be an even greater problem when a number of fluids are being sequentially drawn into a single tip and then dispensed to be mixed. Since the error is nonlinear, it can result in the ratio of the fluids being mixed being incorrect and, thus, either in the improper dilution of a given sample or in a resulting mixture being other than that desired.

Other error sources also exist in pipette operation which may need to be compensated for to achieve high precision operation. For example, when a metered sample is expelled, some small quantity of fluid may remain in the pipette even after an overblow operation. This phenomenon, which results from fluid adhesion to the walls of the pipette tip, surface tension and the like, may be approximated as a constant in some applications.

It is therefore desirable that a method and apparatus be provided for permitting the error resulting from the nonlinear change in dead volume in a pipette to be taken into account when either pipetting a single fluid or when pipetting a number of fluids in sequence, and that this method and apparatus be usable to compensate for other error phenomenon.

SUMMARY OF THE INVENTION

In accordance with the above, this invention provides a method and apparatus for correcting the hydrostatic dead volume error in a pipette system which system includes a pipette tip and a means for moving a controlled volume of fluid either into or from the tip. For the preferred embodiment, fluid volume is moved into or from the tip by a piston which is moved in controlled increments. The dead volume is formed between the fluid and piston when fluid is drawn into the tip. The method and apparatus include determining the height of fluid in the tip for a desired fluid volume, determining the change in the dead volume resulting from having fluid of such height in the tip and determining the piston displacement required to achieve a volume equal to the sum of the desired volume and the determined change in dead volume, this determined displacement being the piston movement required to achieve the desired fluid volume. The formula used for determining height involves a number of terms which are constants for a given tip. The height determination therefore varies as a function of the desired volume. The formula for determining the dead volume change for the preferred embodiment has this dead volume change equal to the desired fluid height times a constant M for a given fluid, system and tip. The constant M is directly proportional to the density of the fluid, acceleration due to gravity, and the dead volume and is inversely proportional to atmospheric pressure. Where a plurality of fluid samples are in the tip, and at least some of such samples are separated by a gas, the height, dead volume and piston displacement determinations are made for each measured piston displacement to either intake or dispense each particular portion of fluid or gas. Where there are multiple samples, the height determination for each sample is made utilizing only fluid heights, without the height for any intervening gas, while the piston displacement calculations are made utilizing all volumes, including fluid sample volumes, gas sample volumes and dead volume corrections. For the preferred embodiment, a lost fluid volume correction value is also added to the volume utilized to perform the piston displacement calculation for a forward dispensing operation to compensate for fluid remaining in the tip after dispensing.

The foregoing and other objects, features and advantages of the invention will be apparent from the following more particular description of preferred embodiments of the invention as illustrated in the accompanying drawings.

IN THE DRAWINGS

DETAILED DESCRIPTION OF THE INVENTION

Figure 1:
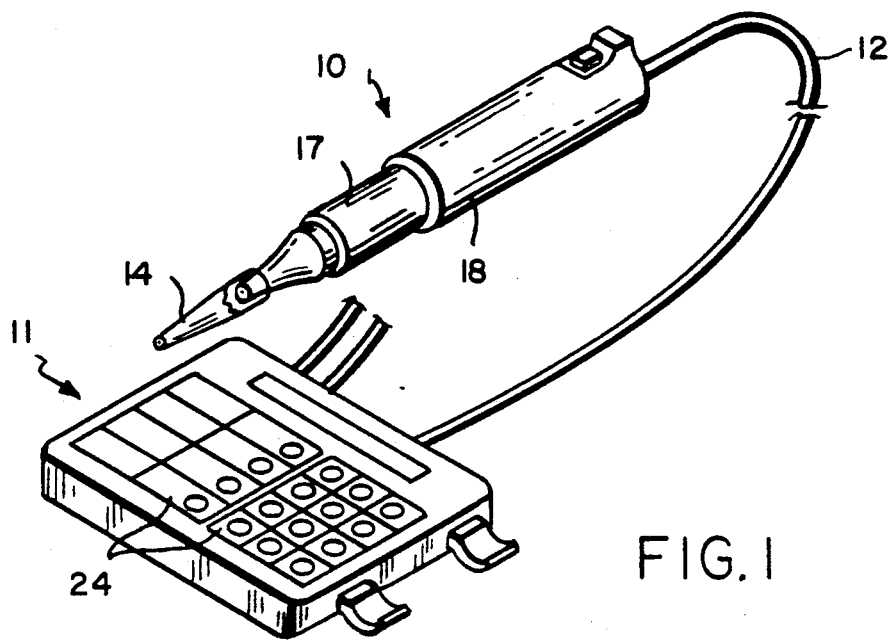
FIG. 1 is a perspective view of an electronic pipette system in which the teachings of this invention may be utilized.

FIG. 1 is a perspective view of a pipette system of the type shown in the before mentioned U.S. Pat. No. 4,821,586. The teachings of this invention may be utilized in such a pipette system. Referring to FIG. 1, the system has a pipette 10 connected through a flexible electrical cable 12 to a pipette control unit 11. A disposable tip 14 is mounted to the end of pipette 10. As is described in greater detail in the patent, and hereinafter, pipette 10 has a nozzle assembly 17 and handle 18. Within nozzle assembly 17 there is a piston which communicates through an air chamber and air channel with tip 14. The dead volume (DV) is the air which is in tip 14 and in nozzle portion 17 below the piston when the nozzle is immersed in a fluid to be drawn into the tip 14. This volume will be a known constant for a given pipette 10, tip 14 and initial position of piston 30.

Control unit 11 includes various keys 24 for inputting data into the control unit, including, for example, the tip 14 being utilized, and the fluid being drawn into or dispensed from the pipette. Control unit 11 also includes a processor, such as a standard microcontroller with suitable Read Only Memory (ROM) and Read/Write Memory (RAM) for performing the various calculations to be described hereinafter.

Figure 2:
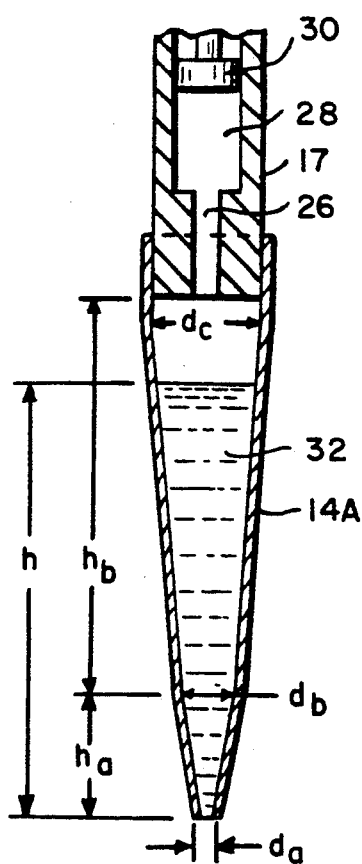
FIG. 2 is a diagrammatic view of a pipette tip for one embodiment of the invention having a single sample therein and of a portion of the pipette nozzle.
Figure 3:
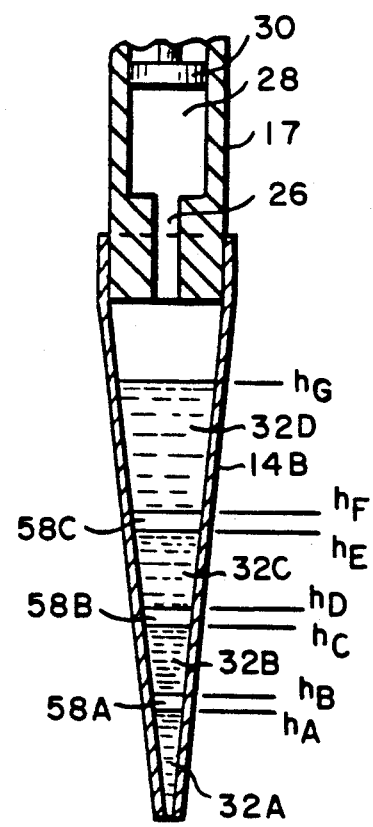
FIG. 3 is a diagrammatic view of a pipette tip for an alternative tip configuration having a plurality of samples therein and of a portion of the pipette nozzle.

FIG. 2 shows in diagrammatic form a tip 14A suitable for use as the tip 14, and also shows, in diagrammatic form, a cutaway portion of the nozzle 17. FIGS. 2 and 3 are not drawn to scale. Tip 14A tapers in two sections, tapering outward from its tip diameter $d_a$ to a diameter $d_b$ over a height $h_a$ and then tapering at a lesser angle to a final diameter $d_c$ over a distance $h_b$. Tip 14A fits over the end of nozzle 17. The nozzle has an air channel 26 formed therein which communicates with a piston chamber 28. A piston 30, moved under control of control unit 11, is positioned in chamber 28 and provides a substantially airtight seal with chamber 28.

When tip 14A is empty, piston 30 is at its home position near, but not at, the bottom of chamber 28. At this point, there is a volume of air in tip 14A, a volume of air in channel 26, some small volume of air in chamber 28 below piston 30 and a small volume of air between the outer diameter of the piston and the piston wall, extending from the tip of the piston to the seal between the piston and the wall of chamber 28. For a preferred embodiment, this volume, which is the DV, will be at least equal to the tip volume, unless an insert is used in the tip. This volume may be in the 2,100–2,300 μl range for a 1000 μl nozzle and tip. This allows the piston and piston chamber to be located remotely from the tip and fluid sample, reducing the potential for contamination. Thus, while it may be possible to reduce the DV below the values given for the preferred embodiment, the DV will still be a substantial value unless expensive tip inserts are utilized.

When tip 14A is immersed in a fluid to be pipetted and piston 30 is raised, there is a reduction in pressure on the dead volume, which reduced pressure is less than the atmospheric pressure being applied to the surface of the fluid. This pressure difference causes the fluid to be drawn into the pipette, the volume of fluid being drawn into tip 14A being a function of the movement of piston 30. The column of fluid 32 drawn into tip 14A has a height h.

However, since the pressure on the dead volume of air is less than the atmospheric pressure which the DV was under when there was no fluid in tip 14A, and since Boyle's Law applies to the DV, namely, PV=K, the decrease in pressure on the DV results in a corresponding increase in DV volume. Since, as previously indicated, the DV may be relatively large compared to the quantity of fluid being drawn into tip 14A, even a relatively small percentage change in the DV as a result of changes in the pressure applied thereto can cause a significant error in the quantity of fluid being drawn into or ejected from the pipette. For example, for a 1000 μl tip having a DV in the range previously indicated, the changes in DV as a result of pressure with 1000 μl in the tip was approximately 14 μl. This error reduced to 6 μl when 200 μl of fluid was in the tip and to 2 μl for 30 μl in the tip. However, while the error as a percentage of the fluid volume for the numbers indicated above was only 1.4% for 1000 μl, it was 3% for 200 μl and 6.7% for 30 μl. The error thus becomes substantially more significant for smaller volumes. This is at least partially true because the DV is substantially constant regardless of fluid volume, resulting in the ratio of DV to fluid volume increasing as the fluid volume decreases. This would be true even if a smaller volume tip 14 is used since much of the DV is in the nozzle 17.

Since the pressure volume product remains constant for the DV, and since the change in pressure on the DV is equal to the product of the fluid height h, the density d of the liquid 32 and the acceleration g due to gravity:

$$Patm \cdot DV = (Patm - hgd) \cdot (DV + x) \tag{1}$$

where x is the expansion in the dead volume.

Multiplying out and solving this equation for x gives:

$$x = hgd \cdot DV / (Patm - hgd) \tag{2}$$

Since it is known that the product hgd is substantially less than Patm, equation (2) can be simplified to:

$$x = hgd \cdot DV / Patm \tag{3}$$

Figure 4:
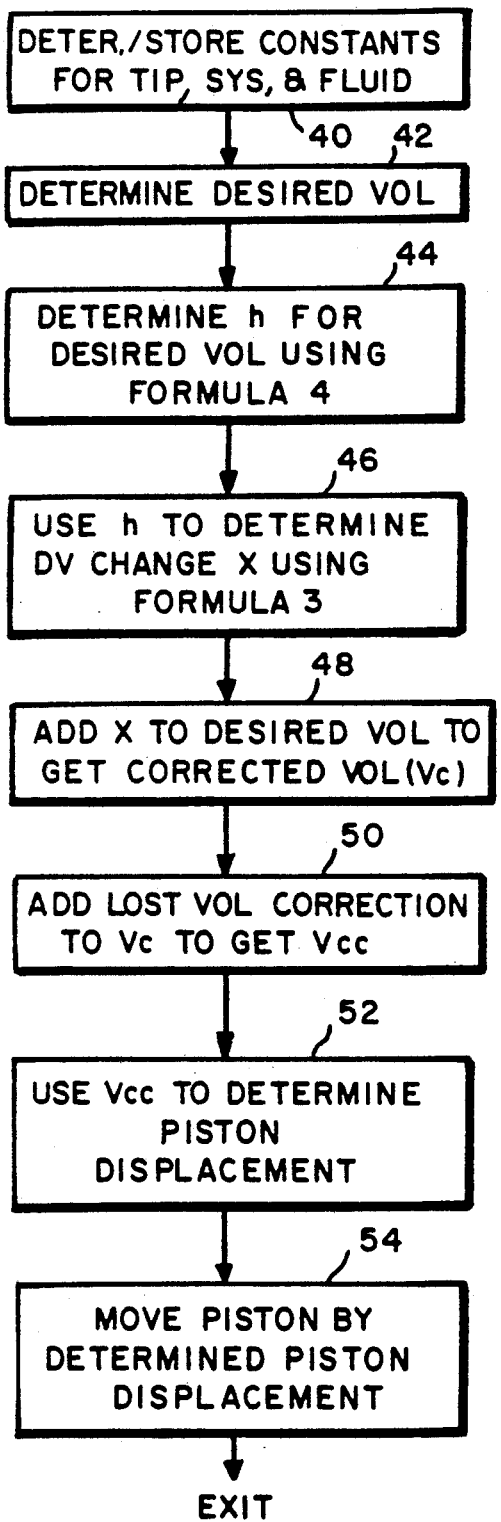
FIG. 4 is a flow diagram of the process for making a piston displacement calculation utilizing the teachings of this invention for a single sample.

Since g and Patm are constants, and since d and DV are constants for a given pipette system and tip and a given fluid, the change in dead volume (x) as a result of pressure difference can be considered to be a function of fluid height. FIG. 4 illustrates a method which may be utilized to correct for changes in dead volume in a pipette system when pipetting a single fluid 32.

Referring to FIG. 4, the first step in the operation, step 40, is to determine various constants for the system, the tip, and the fluid being drawn in or dispensed. The values may be stored in either ROM or RAM, as appropriate. As will be apparent from the following discussion, these derived constants include the dead volume, the diameters $d_a$, $d_b$ and $d_c$ shown in FIG. 2, the height $h_a$ and $h_b$, and the density of the fluid. These numbers will need to be updated if the tip 14 being utilized is changed or if a fluid having a substantially different density is utilized. For example, for the preferred embodiment, the constants are stored in ROM for all nozzle and/or tip sizes and are selected based on the nozzle and/or tip previously selected by the operator. The remaining steps in FIG. 4 are repeated for each operation. It should also at this point be mentioned that, while the discussion to follow will be primarily directed toward a normal mode of operation where fluid is being metered when drawn in, except as otherwise indicated, the process is substantially the same for reverse pipetting where metering is being done on dispensing.

The first step in normal operation, step 42, is to determine the desired volume of fluid 32. While this volume may be inputted by the operator, for the preferred embodiment the microcontroller in controller 11 determines the desired volume as a function of previously stored operator inputs in a manner known in the art. The desired volume is then used during step 44 to determine the height h of fluid 32 in tip 14 by use of the following formula (or its mathematical equivalent):

$$h = a\sqrt[3]{V + b} + c \quad (4)$$

where: V is the desired volume $$a = \sqrt[3]{\frac{12\ (h_2 - h_1)^2}{\pi\ (d_2 - d_1)^2}}$$

$$b = \frac{\pi\ d1^3\ (h2 - h1)}{12\ (d2 - d1)} - V1$$

$$c = h1 - \frac{d1\ (h2 - h1)}{d2 - d1}$$

h1 and d1 are the lower height and diameter of the tip or portions thereof for which calculations are being made;

h2 and d2 are the upper height and diameter of the tip or portions thereof for which calculations are being made; and V1 is the volume of the tip below h1.

Equation (4) may be derived from the equation for the volume of a cone of height h from its apex with a cone angle theta.

However, referring to FIG. 2, it is seen that the tip is in two sections which have different theta angles. Therefore, separate values of a, b and c are calculated for each section as follows. Referring to FIG. 2, the values in the formulas for a, b and c for the first or lower section are:

h1 = 0 h2 = ha d1 = da d2 = db

V1 = 0

For the second section h1 = ha h2 = hc = ha + hb d1 = db d2 = dc

V1 = total volume of the first segment.

In the preferred embodiment, these values and the value of the volume of the first segment is stored in ROM. (It is obvious that this method can be extended to any number of sections by using the lower and upper diameters of the segments, the lower and upper values for h, and the total volume of segments below the lower diameter for V1.) In order to compute height, the desired fluid volume is compared to the volume of the first segment. If it is less, the first set of constants are selected. If it is greater, the second set of constants are selected. The height is computed using equation (4).

Once the height h for a desired volume has been determined, the operation proceeds to step 46 to use the determined height h in formula (3) to determine the DV change x for the given fluid height. As previously indicated, all of the values except the height h in equation (3) are either constants or constants for a given tip, pipette system and fluid so that x may easily be determined by merely multiplying the determined height by the stored constant. In the alternative, the individual values for equation (3) may be stored and inputted into the processor each time x needs to be calculated.

Once the dead volume change has been determined, this volume change is added to the desired volume during step 48 to obtain a corrected volume ($V_C$).

As previously indicated, as a result of surface tension, adherence of fluid to the side of tip 14 and possibly other factors, even if an overblow is performed when dispensing a measured quantity of fluid, a small quantity of the fluid remains in the tip. This results in an error which may be in the range of 1 or more $\mu$l. For precise metering operations, this error, which is normally constant for a given tip, may be unacceptable. Therefore, from step 48, the operation proceeds to step 50 where a lost volume correction is added to the corrected volume $V_C$ to get a modified corrected volume $V_{CC}$. However, when metering is performed on ejection rather than on drawing in, an extra quantity of fluid is initially drawn into tip 14 so that a precise quantity of fluid may be dispensed. The extra fluid is then disposed of with an overblow operation. Therefore, step 50 would be performed only when metering is being performed on the drawing of fluid into tip 14 rather than when metering is being performed on the ejection of fluid.

Once a corrected volume has been determined, either through step 48 or through step 50 when utilized, the corrected volume is used to determined piston displacement. The procedure for determining piston displacement in order to draw a given volume into tip 14 is known in the art of pipette systems, and standard techniques for performing this function may be utilized during step 52. To the extent necessary, a rounding to the nearest unit for piston displacement may be performed during step 52. Once the required piston displacement has been determined during step 52, the piston is moved by the determinant piston displacement during step 54 in order to either draw in or dispense the desired precise quantity of fluid. Once step 54 has been completed, the operation is completed and the pipette is ready to perform the next pipetting operation.

FIG. 3 shows an alternative tip 14B which tapers uniformly rather than in two sections. In addition, for purposes of illustration, FIG. 3 shows the tip 14B being utilized to pipette four different fluids 32A–32D. Further, for purposes of illustration, each two adjacent layers of fluid 32 are shown in the figure as being separated by an intake of air (or possibly some other gas) 58A-58C. FIG. 3 is not drawn to scale so that a fluid sample 32 may be as large as several hundred microliters or as small as a few microliters in various applications. The air intakes 58 might typically be in a range of 50 microliters.

Figure 5:
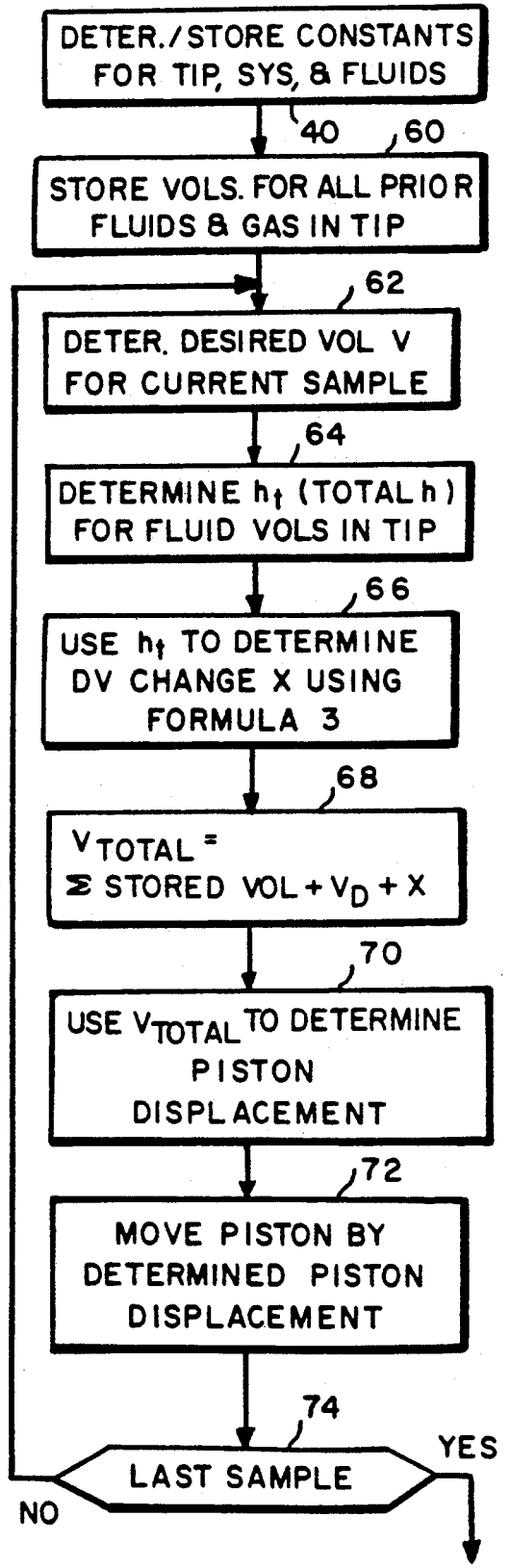
FIG. 5 is a flow diagram of the piston displacement determination where there are multiple samples.

FIG. 5 illustrates the procedure for making corrective piston movement determinations for a multi sample embodiment such as that shown in FIG. 3. Referring to FIG. 5, the first step in the operation is the same step 40 as for FIG. 4, wherein various required constants are determined and stored in the system. However, since a variety of fluids 32 may be inputted, which fluids may have different densities, it may be necessary to store a number of fluid densities for step 40. Again, step 40 may be performed only once for a large number of pipetting operations.

From step 40, the operation proceeds to step 60. This step indicates that for the particular sample for which a calculation is being made, the volumes for all prior fluid samples 32 and gas samples 58 are stored. Step 60 merely reflects that the values computed for all prior stored volumes are available in the system and is not necessarily an independent step.

During step 62, the next step in the operation, the desired volume VD for the current sample is determined. The desired volume is then utilized along with the previous volumes to determine the total height for fluid volumes in the tip during step 64. Thus, during step 64, heights are computed for the fluid in areas 32A-32D (FIG. 3) but not for the areas 58A-58C which contain air. This may be accomplished by computing the height for each volume using equation (4) and then adding heights which have air above them and fluid below while subtracting heights which have fluid above them and air below. Thus, in FIG. 3, the desired total height would be obtained by adding heights hg, he, hc and ha and subtracting from this sum the values of heights hf, hd and hb. To the extent a transition exists between two fluids not separated by an air intake or between two gases, this transition is ignored in the procedure discussed above for determining total height. The reason for using only fluid heights to make the DV correction calculation is that the air segments do not develop hydrostatic changes in pressure. Therefore, these heights do not contribute to the hydrostatic pressure exerted by the total fluid column, and hence do not contribute to the change in DV due to pressure changes.

Once the total height of the fluid volumes is determined during step 64, this height is utilized during step 66 to determine the DV change x for such fluid height using equation (3).

Once the DV change x has been determined, the operation proceeds to step 68 during which the total volume in the tip is determined by summing all of the stored volumes, plus the desired volume VD and plus the determined value of x. A lost volume correction may also be added for the last sample to be outputted, sample 32D in FIG. 3. The $V_{total}$ value is then stored and may be used as a stored total volume during steps 64 and 68 for future calculations. During step 70, the $V_{total}$ determined during step 68 is utilized to determine total piston displacement for the desired volume. This determination is made in he same manner indicated with respect to step 52 previously discussed. The piston displacements previously made are then subtracted from this determined piston displacement and the piston is moved by the resulting amount during step 72.

During step 74, a determination is made as to whether the sample inputted is the last sample. If the sample inputted is not the last sample, the operation returns to step 62 to determine the desired volume for the next sample and the process is repeated. If the sample is determined to be the last sample during step 74, the inputting operation is completed and the stored samples may be dispensed for dilution, mixing or other purposes.

A method and apparatus has thus been provided for permitting the hydrostatic error in dead volume to be compensated for in a pipette system. The system also permits a lost fluid volume correction to be made and similar techniques could be utilized to correct for other potential error sources in pipette systems to afford pipette readings having a high degree of accuracy.

While for the preferred embodiment, it has been assumed that, for a single fluid, the intake metering operation or the metering on dispensing during a reverse mode operation have occurred in a single operation, it is possible, particularly in reverse mode, that dispensing may occur in several steps. The calculations discussed above in conjunction with FIG. 4 could be performed for each such step to assure accurate dispensing of a metered quantity of fluid. Also, in the discussion with respect to FIG. 5, any volume changes in the air intakes 58 as a result of pressure variations have been ignored. This has been done because the volume of these air intakes is so small compared to the DV that such volume changes would generally be of too little effect to be noticeable. However, the teachings of this invention could be utilized to correct for such changes if necessary. In addition, while the equations provided above, in particular the equation for a height determination, have assumed a conical tip, this is not a limitation on the invention, and the invention could be equally applied for tips having oval, triangular, rectangular, or other cross-sections. The height determination for a tip having such a cross section would be the appropriate calculation to determine height with a known volume for such a geometric shape. Further, while for the preferred embodiment, and to simplify calculations, height for a desired volume has been determined for the preferred embodiment, and then a separate calculation has been made to determine DV change for this height. However, it is apparent that the DV change could be determined from a single calculation utilizing a formula which, for example, substituted the formula for height determination of equation (4) into equation (3). Since a determination of height would still be made in such a procedure as part of the dead volume expansion computation, such a mode of operation would be regarded as still being within the teachings of this invention. Finally, while a particular electronic pipette configuration has been utilized for the preferred embodiment, it is apparent that the teachings of this invention could be utilized in any pipette system having a sufficient dead volume to cause a noticeable hydrostatic error and computing capabilities.

Thus, while the invention has been particularly shown and described above with reference to preferred embodiments, the foregoing and other changes in form and detail may be made therein by one skilled in the art while still remaining within the spirit and scope of the invention.

What is claimed is:

1. Apparatus for correcting for hydrostatic dead volume error in a pipette system, which system includes a pipette tip, and means for moving a controlled volume of fluid either into or from the tip, said means including a piston and means for causing said piston to move in controlled increments, said dead volume being formed between the fluid and piston when fluid is drawn into said tip, the apparatus comprising:

means for determining the height h of fluid in said tip for a desired fluid volume;

means for determining the change in the dead volume resulting from having fluid of such height in the tip; and means for determining the piston displacement required to achieve a volume equal to the sum of the desired volume plus the determined change in dead volume, this being the piston movement required to achieve the desired fluid volume.

2. Apparatus as claimed in claim 1 wherein said tip is a substantially conical tip, and wherein said height determination is made using the formula:

$$h = a\sqrt[3]{V + b} + c \quad (A)$$

where: V is the desired volume $$a = \sqrt[3]{\frac{12 \, (h_2 - h_1)^2}{\pi \, (d_2 - d_1)^2}}$$

$$b = \frac{\pi \, d1^3 \, (h2 - h1)}{12 \, (d2 - d1)} - V1$$

$$c = h1 - \frac{d1 \, (h2 - h1)}{d2 - d1}$$

h1 and d1 are the lower height (from bottom of tip) and diameter of the tip or portions thereof for which calculations are being made;

h2 and d2 are the upper height and diameter of the tip or portions thereof for which calculations are being made; and V1 is the volume of the tip below h1.

3. Apparatus as claimed in claim 2 wherein said tip has at least two sections with different tapers; and wherein said means for determining height h utilized formula (A) independently for each section.

4. Apparatus as claimed in claim 2 wherein a, b and c are constants for a given pipette tip.

5. Apparatus as claimed in claim 2 wherein said means for determining dead volume change determines said change by use of the formula:

$$x = \frac{hgd \, DV}{Patm}$$

where:
x = change in dead volume
DV = initial dead volume
Patm = atmospheric pressure
d = density of fluid
g = acceleration due to gravity.

6. Apparatus as claimed in claim 1 wherein said means for determining dead volume change determines said change by use of the formula:

$$x = \frac{hgd \, DV}{Patm}$$

where:
x = change in dead volume
DV = initial dead volume
Patm = atmospheric pressure
d = density of fluid
g = acceleration due to gravity.

7. Apparatus as claimed in claim 6 wherein gd DV/Patm are a constant M for a given fluid, system and tip, whereby the formula for determining dead volume change reduces to x = hM.

8. Apparatus as claimed in claim 1 wherein a plurality of fluid samples are in said tip, at least some of which are separated by a gas; and wherein said height, dead volume and piston displacement determinations are made for each measured piston displacement to either intake or dispense a sample.

9. Apparatus as claimed in claim 8 wherein said height determination for each sample is made utilizing only fluid heights without volume for any intervening gas.

10. Apparatus as claimed in claim 1 including means for adding a lost volume correction value to the volume utilized to perform the piston displacement calculation to compensate for fluid remaining in the tip after dispensing.

11. A method for correcting for hydrostatic dead volume error in a pipette system, which system includes a pipette tip, and means for moving a controlled volume of fluid either into or from the tip, said means including a piston and means for causing said piston to move in controlled increments, said dead volume being formed between the fluid and piston when fluid is drawn into said tip; the method comprising the steps of:

determining the height h of fluid in said tip for a desired fluid volume, determining the change in the dead volume resulting from having fluid of such height in the tip; and determining the piston displacement required to achieve a volume equal to the sum of the desired volume plus the determined change in dead volume, this being the piston movement required to achieve the desired fluid volume.

12. A method as claimed in claim 11 wherein said tip is a substantially conical tip, and wherein said height and piston displacement determinations are made using the formula:

$$h = a\sqrt[3]{V + b} + c \quad (A)$$

where: V is the desired volume $$a = \sqrt[3]{\frac{12 \, (h_2 - h_1)^2}{\pi \, (d_2 - d_1)^2}}$$

$$b = \frac{\pi \, d1^3 \, (h2 - h1)}{12 \, (d2 - d1)} - V1$$

$$c = h1 - \frac{d1 \, (h2 - h1)}{d2 - d1}$$

h1 and d1 are the lower height (from bottom of tip) and diameter of the tip or portions thereof for which calculations are being made;

h2 and d2 are the upper height and diameter of the tip or portions thereof for which calculations are being made; and V1 is the volume of the tip below h1.

13. A method as claimed in claim 12 wherein said tip has at least two sections with different tapers; and wherein said means for determining height h utilized formula (A) independently for each section.

14. A method as claimed in claim 12 wherein a, b and c are constants for a given pipette tip.

15. A method as claimed in claim 12 wherein said dead volume change determining step determines said change by use of the formula:

$$x = \frac{hgd\ DV}{Patm}$$

where:
x = change in dead volume
DV = initial dead volume
Patm = atmospheric pressure
d = density of fluid
g = acceleration due to gravity.

16. A method as claimed in claim 11 wherein said dead volume change determining step determines said change by use of the formula:

$$x = \frac{hgd\ DV}{Patm}$$

where:
x = change in dead volume
DV = initial dead volume
Patm = atmospheric pressure
d = density of fluid
g = acceleration due to gravity.

17. A method as claimed in claim 16 wherein gd DV/Patm are a constant M for a given fluid, system and tip, whereby the formula for determining dead volume change reduces to x = hM.

18. A method as claimed in claim 11 wherein a plurality of fluid samples are in said tip, at least some of which are separated by a gas; and wherein said height, dead volume and piston displacement determinations are made for each measured piston displacement to either intake or dispense a sample.

19. A method as claimed in claim 18 wherein said height determination for each sample is made utilizing only fluid heights without height for any intervening gas.

20. A method as claimed in claim 11 including the step of adding a lost volume correction value to the volume utilized to perform the piston displacement calculation to compensate for fluid remaining in the tip after dispensing.

* * * * *